(12) United States Patent
Amma

(10) Patent No.: US 9,709,742 B2
(45) Date of Patent: Jul. 18, 2017

(54) MULTICORE FIBER CONNECTION METHOD AND MULTICORE FIBER CONNECTOR USING SAME

(71) Applicant: FUJIKURA LTD., Tokyo (JP)

(72) Inventor: Yoshimichi Amma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/062,555

(22) Filed: Mar. 7, 2016

(65) Prior Publication Data

US 2016/0187584 A1 Jun. 30, 2016

Related U.S. Application Data

(63) Continuation of application No. PCT/JP2015/062068, filed on Apr. 21, 2015.

(30) Foreign Application Priority Data

May 12, 2014 (JP) .................. 2014-098684

(51) Int. Cl.
*G02B 6/255* (2006.01)
*G02B 6/02* (2006.01)
*G02B 6/036* (2006.01)

(52) U.S. Cl.
CPC ......... *G02B 6/2551* (2013.01); *G02B 6/2555* (2013.01); *G02B 6/02042* (2013.01); *G02B 6/036* (2013.01)

(58) Field of Classification Search
CPC G02B 6/2551; G02B 6/02042; G02B 6/2555; G02B 6/02; G02B 6/036; G02B 6/25; G02B 6/255
See application file for complete search history.

(56) References Cited

U.S. PATENT DOCUMENTS

| 2006/0171643 | A1 | 8/2006 | Hattori | |
| 2013/0251320 | A1* | 9/2013 | Hayashi | G02B 6/02042 385/100 |
| 2013/0312899 | A1* | 11/2013 | Arakawa | B29C 65/02 156/158 |

FOREIGN PATENT DOCUMENTS

| EP | 1 039 319 A2 | 9/2000 |
| JP | 4-184401 A | 7/1992 |
| JP | 2013-210602 A | 10/2013 |

OTHER PUBLICATIONS

International Search Report dated Jun. 23, 2015, issued in Counterpart of International Application No. PCT/JP2015/062068 (1 page).

(Continued)

*Primary Examiner* — Ryan Lepisto
(74) *Attorney, Agent, or Firm* — Westerman, Hattori, Daniels & Adrian, LLP

(57) ABSTRACT

A method of connecting multicore fibers 2 includes a shaping step S2 and a fusing step S3. The multicore fibers 2 satisfy Y≥20, where a distance from a center of a core 11 located on the outer periphery side of a clad 20 to a side surface of the clad 20 is defined as Y μm. The shaping step S2 includes heating a end surfaces 50 to satisfy 0<X/Y≤0.0054Y+0.268, where a distance in a longitudinal direction from a portion of each multicore fiber 2 located at an end in the longitudinal direction on each shaped end surface 50 to a position at which the end surface 50 and the side surface of the clad 20 meet each other is defined as X μm.

6 Claims, 8 Drawing Sheets

(56) References Cited

OTHER PUBLICATIONS

Extended (supplementary) European Search Report dated Mar. 14, 2017, issued in counterpart European Patent Application No. 15793483.7. (8 pages).

* cited by examiner

MULTICORE FIBER CONNECTION METHOD AND MULTICORE FIBER CONNECTOR USING SAME

TECHNICAL FIELD

The present invention relates to a multicore fiber connection method which can reduce connection loss and a multicore fiber connector using the method.

BACKGROUND ART

With spread of an optical fiber communication system, an amount of information transmitted has dramatically increased. With the increase in the amount of information transmitted, high-capacity-long-distance optical communication is carried out using a large number of optical fibers such as a dozen or a hundred of optical fibers in the optical fiber communication system.

In order to increase transmission capacity per optical fiber in such an optical fiber communication system, it is known that plural signals are transmitted by light propagating through plural cores using a multicore fiber in which outer peripheries of the cores are surrounded with a single clad. In the optical fiber communication system, plural optical fibers may be connected for use to carry out long-distance optical communication. In addition, plural multicore fibers may be connected for use in the optical fiber communication system using a multicore fiber.

Patent Literature 1 describes a multicore fiber connection method. In the connection method described in the literature, connected portions at which end surfaces of multicore fibers to be connected butt each other are disposed between a pair of electrodes and the end surfaces of the optical fibers are fused to each other by causing the pair of electrodes to electrically discharge.

[Patent Literature 1] JP-A-203-210602

SUMMARY OF INVENTION

In connecting optical fibers, in general, the end surfaces of the optical fibers are fused to each other after the connected end surfaces thereof are shaped. Minute unevenness on the end surfaces is removed in the shaping by heating the end surfaces until the connected end surfaces are softened.

However, when the shaping is performed using the heating, the edges of the end surfaces and the side surface of the clad are slowly rounded, the centers of the end surfaces protrude, and thus the shape of the end surfaces is likely to be changed to a convex surface shape. In the case of a single-core fiber, connection loss in the optical fibers after being connected can be suppressed even when the end surfaces are shaped in a convex surface shape. However, in the case of a multicore fiber, it has been found that the connection loss might be increased.

The reason why the connection loss is suppressed in the case of a single-core fiber is that even when the end surfaces with a convex surface shape are deformed and fused at the time of connection, the core is located at only a most protruding portion of the convex surface and thus the core is not affected much by a distortion due to a deformation in the end surface. However, in the case of a multicore fiber, the cores are arranged at positions other than the center of the clad. When an end surface thereof has a convex surface shape, a core surface which is a part on the end surface of a core located at a position other than the center of the clad is positioned on an inclined surface. When an inclination angle of the core surface is large or when a distance in the longitudinal direction of the multicore fiber from a most protruding portion of the end surface to the core surface is large, it is thought that connection surfaces of the cores are distorted in fusing the multicore fibers. It is considered that the connection loss is increased due to the distortion.

Therefore, in shaping end surfaces of multicore fibers, it is considered that the shaping is performed such that the inclination angle or the distance is equal to or less than a predetermined value by performing the shaping while measuring the inclination angle of the core surface or the distance from the most protruding portion of the end surface to the core surface through side surface observation. However, in observing the side surfaces of the multicore fibers, it is often difficult to accurately grasp the positions of the cores. Accordingly, it is difficult to perform the shaping such that the inclination angle or the distance is equal to or less than a predetermined value through such observation. As a result, it is difficult to connect multicore fibers by properly shaping the end surfaces through the side surface observation.

Therefore, an object of the present invention is to provide a multicore fiber connection method which can reduce connection loss and a multicore fiber connector using the connection method.

The inventor of the present invention found that it is possible to reduce connection loss and to connect multicore fibers without accurately grasping positions of cores in shaping by grasping a position at which a side surface of a clad and a fused end surface meet each other and thus made the present invention.

That is, the present invention provides a multicore fiber connection method of connecting multicore fibers, including: a shaping step of shaping connected end surfaces of the multicore fibers by heating the end surfaces of the multicore fibers; and a fusing step of fusing the shaped end surfaces to each other, In addition, the present invention provides a multicore fiber connector in which a plurality of multicore fibers are connected to each other, wherein the multicore fibers are connected through a shaping step of shaping connected end surfaces of the multicore fibers by heating the end surfaces of the multicore fibers and a fusing step of fusing the shaped end surfaces to each other.

In the multicore fiber connection method and the multicore fiber connector, the multicore fibers satisfy the following expression:

$$Y \geq 20 \quad (1)$$

where a distance from a center of a core located on the outer periphery side of a clad to a side surface of the clad is defined as Y µm. The shaping step includes heating the end surfaces to satisfy the following expression:

$$0 < X/Y \leq 0.0054Y + 0.268 \quad (2)$$

where a distance in a longitudinal direction from a part of each multicore fiber located at an end in the longitudinal direction on each shaped end surface to a position at which the end surface and the side surface of the clad meet each other is defined as X µm.

The inventor of the present invention found that connection loss after being connected could be reduced by satisfying such conditions in shaping the end surfaces of the multicore fibers. The reason why the connection loss could be reduced in this way is considered as follows. That is, it is thought that even when a distortion is caused in the side surface of the clad in the connected portions at the time of fusing, an influence of the distortion on the cores can be suppressed by satisfying Expression (1). It is also thought that an inclination angle of a core surface located on the shaped end surface or a distance in a direction parallel to the longitudinal direction of the multicore fiber from the most protruding portion of the end surface to the core surface can be set to be smaller than a predetermined magnitude to suppress a distortion of the cores at the time of connection by satisfying Expression (2).

As a result, according to the multicore fiber connection method and the multicore fiber connector of the present invention, it is possible to suppress a distortion of a core and thus to reduce connection loss.

In addition, it is preferable that the multicore fiber connection method further include, before the shaping step, a butting step of causing the end surfaces of the multicore fibers to butt each other such that cores of one multicore fiber and cores of the other multicore fiber face each other with a predetermined gap interposed therebetween, and the shaping step is preferably performed in a state in which the end surfaces butt each other.

By shaping the multicore fibers to be connected in a state in which the multicore fibers butt each other, it is possible to shape the end surfaces of two multicore fibers to be connected with the substantially same conditions and thus to shape the end surfaces in a substantially identical shape.

In this case, it is preferable that the end surfaces of the multicore fibers are continuously heated from the shaping step to the fusing step.

By continuously heating the end surfaces from the shaping to the fusing, it is possible to prevent the end surfaces of the multicore fibers from being hardened between the shaping and the fusing. That is, it is possible to prevent the end surfaces of the multicore fibers to be fused from being repeatedly softened and hardened due to heating and cooling and thus to suppress a deformation of the end surfaces of the multicore fibers.

In addition, the multicore fibers may satisfy $Y \geq 25$, and the shaping step may include heating the end surfaces so as to satisfy $X/Y \leq 0.42$.

In addition, the multicore fibers may satisfy $Y \geq 35$, and the shaping step may include heating the end surfaces so as to satisfy $X/Y \leq 0.45$.

In addition, the multicore fibers may satisfy $Y \geq 43$, and the shaping step may include heating the end surfaces so as to satisfy $X/Y \leq 0.50$.

As described above, according to the present invention, it is possible to provide a multicore fiber connection method which can reduce connection loss and a multicore fiber connector using the connection method.

DESCRIPTION OF EMBODIMENTS

Hereinafter, exemplary embodiments of a multicore fiber connector according to the present invention will be described in detail with reference to the accompanying drawings. For the purpose of easy understanding, scales may vary depending on the drawings.

Figure 1:
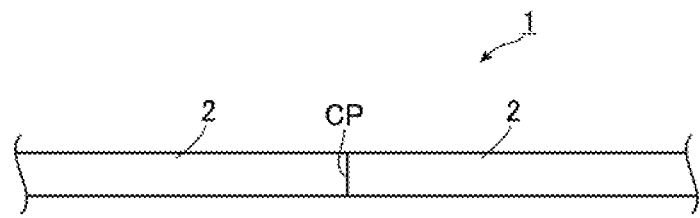
FIG. 1 is a diagram illustrating a multicore fiber connector according to an embodiment of the present invention.

FIG. 1 is a diagram illustrating a multicore fiber connector according to an embodiment of the present invention. As illustrated in FIG. 1, a multicore fiber connector 1 according to this embodiment has a structure in which plural multicore fibers 2 are connected to each other at a connection portion CP. The multicore fiber connector 1 is used for optical communication.

Figure 2:
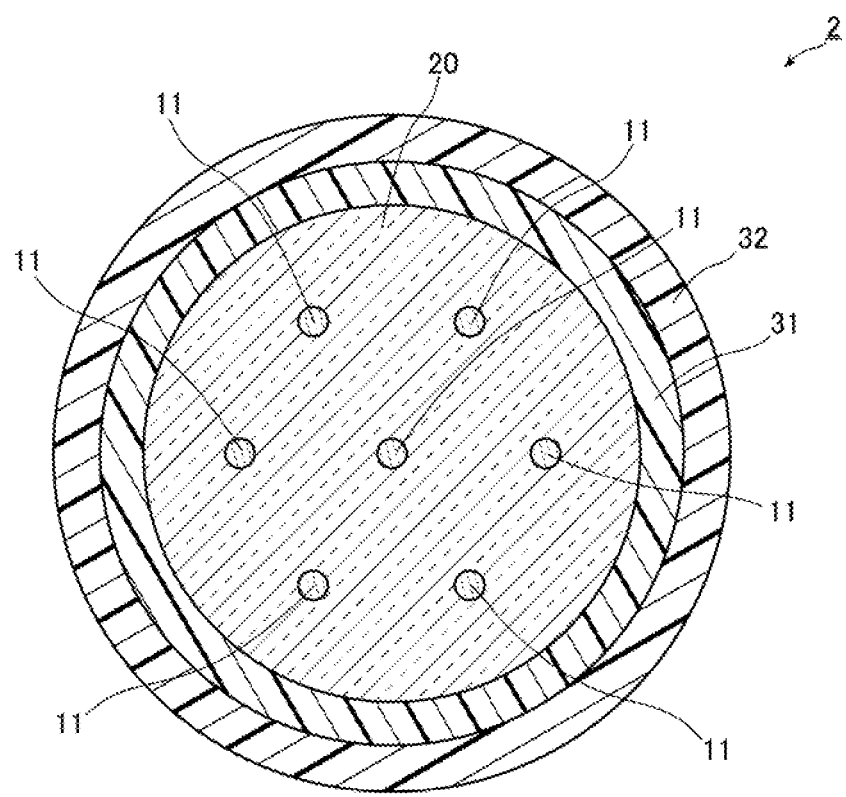
FIG. 2 is a cross-sectional view of the multicore fiber illustrated in FIG. 1.

FIG. 2 is a cross-sectional view of the multicore fibers 2 illustrated in FIG. 1. As illustrated in FIG. 2, the multicore fibers 2 connected to each other have the same configuration and include plural cores 11, a clad 20 surrounding the outer peripheral surfaces of the cores 11, an inner side protective layer 31 surrounding the outer peripheral surface of the clad 20, and an outer side protective layer 32 surrounding the outer peripheral surface of the inner side protective layer 31.

In this embodiment, the number of cores 11 is seven, one core 11 is arranged at the center, and the other six cores 11 are arranged at equal intervals on the outer periphery side. That is, the cores 11 are arranged in a 1-6 arrangement manner. In this way, the plural cores 11 are arranged in a triangular lattice shape. The plural cores 11 arranged in this way are symmetric with respect to the central axis of the clad 20.

The diameter of the core 11 is, for example, 10 μm. The diameters of the cores 11 may be equal to each other or may be set such that the diameters of the neighboring cores 11 are different from each other, for example, by about 1.0% to 2.0%. Even when the diameters of the neighboring cores 11 are physically slightly different from each other, the diameters of respective cores 11 make little difference for the light propagating through the cores 11, and the cores 11 have substantially equivalent optical properties. The diameter of the clad 20 is set to, for example, 185 μm. In this case, for example, the core pitch (inter-center distance) of the cores 11 is set to 49.5 μm, and a distance (outer clad thickness) between the center of a core 11 on the outer periphery side and the outer peripheral surface of the clad 20 is set to 43 μm. When the magnitude of the outer clad thickness is defined as Y μm, the multicore fibers 2 satisfy the following Expression (1).

$$Y \geq 20 \tag{1}$$

By setting the outer clad thickness to 20 μm or more, it is possible to prevent an outer periphery side part of light propagating through the core 11 on the outer periphery side from being caught and absorbed by the inner side protective layer 31.

The refractive index of each core 11 is set to be higher than the refractive index of the clad 20. Each core 11 is formed of quartz which has been doped with a dopant such as germanium (Ge) raising the refractive index. In this case, the clad is formed of, for example, pure quartz. The refractive indices of the cores 11 may be equal to each other, but the refractive indices of the neighboring cores 11 may be different from each other, for example, by about 1.0% to 2.0%. In this way, even when the refractive indices of the neighboring cores 11 are physically slightly different from each other, the refractive indices of respective cores 11 make little difference for the light propagating through the cores 11, and the cores 11 have substantially equivalent optical properties.

In such a multicore fiber connector 1, for example, light propagates through the cores 11 in a single mode.

A method of connecting multicore fibers 2 to form a multicore fiber connector 1 will be described below.

Figure 3:
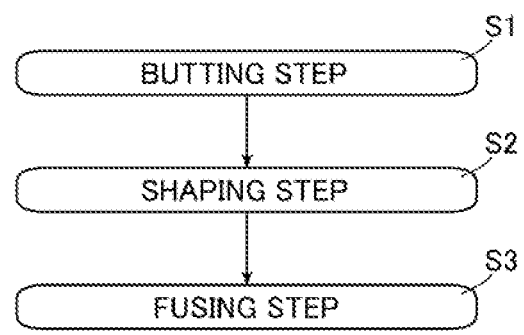
FIG. 3 is a flowchart illustrating a method of connecting multicore fibers.

FIG. 3 is a flowchart illustrating the method of connecting the multicore fibers 2 illustrated in FIG. 1 to form the multicore fiber connector 1. As illustrated in FIG. 2, the method of connecting the multicore fibers 2 includes a butting step S1 of causing the end surfaces of the multicore fibers 2 to butt each other, a shaping step S2 of shaping the end surfaces, and a fusing step S3 of fusing the multicore fibers 2, of which the end surfaces butt each other, to each other as main steps.

<Butting Step S1>

Figure 4:
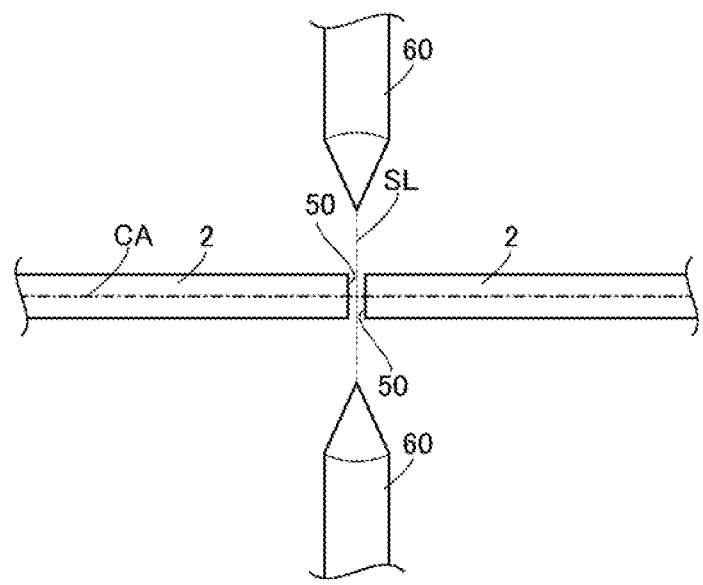
FIG. 4 is a diagram illustrating a state after a butting step.

First, plural multicore fibers 2 illustrated in FIG. 1 are prepared. FIG. 4 is a diagram illustrating a state in which the prepared multicore fibers 2 are set in a fusing device of which the main body is not illustrated. Before the multicore fibers 2 are set in the fusing device, the inner side protective layer 31 and the outer side protective layer 32 in the vicinity of the connected end surface 50 of each multicore fiber 2 are peeled off. Accordingly, the inner side protective layer 31 and the outer side protective layer 32 are not illustrated in FIG. 4. It is preferable that the angle of the connected end surface 50 of each multicore fiber 2 be one degree or less with respect to a plane perpendicular to the central axis of the clad 20, because the multicore fibers 2 can be more appropriately connected in the fusing step S3. In this embodiment, the fusing device has the multicore fibers 2 to be connected arranged horizontally and includes a pair of discharge electrodes 60 that heats the end surfaces 50 of the multicore fibers 2.

As illustrated in FIG. 4, the multicore fibers 2 are set in the fusing device in a state in which the connected end surfaces 50 of the multicore fibers 2 face each other with a predetermined gap interposed therebetween. The central axes CA of the clads 20 of the multicore fibers 2 match each other. That is, the multicore fibers 2 are arranged such that the central axes CA of the clads 20 of the multicore fibers 2 are located in the same straight line. In matching the central axes of the multicore fibers 2, the outer peripheral surfaces of the clads 20 of the multicore fibers 2 can be set to be flush with each other while observing the side surfaces of the multicore fibers 2.

As illustrated in FIG. 4, it is preferable that a straight line SL connecting tips of the pair of discharge electrodes 60 mounted on the fusing device be located between the end surfaces 50 to be fused of the multicore fibers 2.

Then, at least one multicore fiber 2 is rotated about the axis such that the cores 11 of one multicore fiber 2 face the cores 11 of the other multicore fiber 2. At this time, it is preferable that the angle formed by the end surface 50 of one multicore fiber 2 and the end surface 50 of the other multicore fiber 2 be equal to or less than 0.5 degrees, because the multicore fibers 2 are more appropriately connected to each other in the fusing step S3.

In this way, the multicore fibers 2 butt each other.

<Shaping Step S2>

Then, the shaping step S2 is performed to shape the end surfaces 50 to be connected of the multicore fibers 2.

Figure 5:
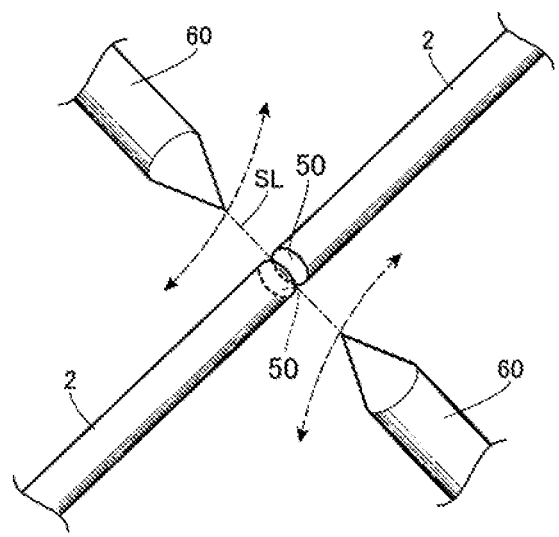
FIG. 5 is a diagram illustrating a state after a shaping step.

FIG. 5 is a diagram illustrating a state of this step. The shaping of the end surfaces 50 is performed by heating the end surfaces 50. Specifically, as illustrated in FIG. 5, the discharge electrodes 60 of the fusing device are made to vibrate so as to repeat vertical vibration in a state in which the multicore fibers 2 butt each other. The straight line SL connecting the tips of the discharge electrodes 60 moves while drawing a plane perpendicular to the central axes CA of the clads 20 of the multicore fibers 2 by the vibration of the discharge electrodes 60. In a state in which the tips of the discharge electrodes 60 vertically reciprocate, a high voltage is applied across the pair of discharge electrodes 60 to perform electric discharge. At this time, it is preferable that the discharge electrodes 60 vibrate in synchronization with each other. In this case, since the tips of the discharge electrodes 60 maintain a horizontal relative position, it is easy to understand a heat distribution due to the electric discharge.

Figure 6:
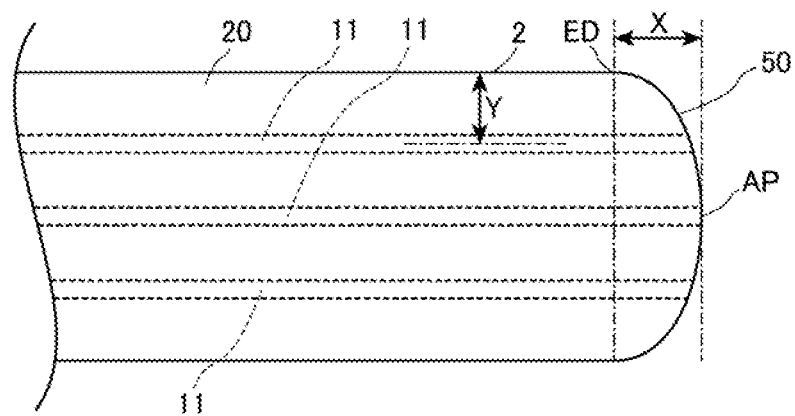
FIG. 6 is a diagram illustrating a state around an end surface of a multicore fiber after the shaping step.

Energy based on the electric discharge from the discharge electrodes 60 is converted into heat and thus the end surfaces 50 of the multicore fibers 2 butting each other are softened. At this time, the edges of the end surfaces 50, that is, portions at which the end surfaces 50 and the clads 20 meet each other, are first softened and rounded. By continuously performing the heating due to the electric discharge, the softened end surfaces 50 are shaped by a surface tension to remove minute unevenness of the end surfaces 50. FIG. 6 is a diagram illustrating the vicinity of an end surface 50 of the multicore fiber 2 after being shaped. The shaped end surface 50 tends to be curved in a convex shape and a portion intersecting the central axis CA is likely to be the most protruding. That is, the central portion of the end surface 50 tends to be an apex AP located at the end in the longitudinal direction of the multicore fiber 2.

As illustrated in FIG. 6, after being shaped, the distance in the longitudinal direction of the multicore fiber 2 from the apex AP of the end surface 50 to a portion ED at which the end surface 50 meets the side surface of the clad 20 is defined as X μm. Then, the multicore fiber 2 satisfies the following Expression (2).

$$0 < X/Y \leq 0.0054Y + 0.268 \qquad (2)$$

That is, in this step, the end surfaces 50 are heated to satisfy the above Expression (2). The value of Y can be measured in advance. Accordingly, the end surfaces 50 can be heated to obtain X satisfying the above Expression (2) while observing the end surfaces of the multicore fibers 2 during heating.

The end surfaces 50 of the multicore fibers 2 are shaped in this way.

<Fusing Step S3>

Then, the end surfaces 50 of the multicore fibers 2 are fused to each other. Specifically, similarly to the shaping step S2, the electric discharge is performed while causing the discharge electrodes 60 to vibrate. The multicore fibers 2 are moved such that the facing end surfaces 50 come in contact with each other. When the multicore fibers 2 are appropriately fused to each other, the movement of the multicore fibers 2 and the electric discharge are stopped.

The end surfaces 50 of the multicore fibers 2 may not be heated continuously from the shaping step S2 to this step, but it is preferable that the end surfaces be heated continuously. By heating the end surfaces continuously, the end surfaces 50 can be maintained in the softened state. By performing the shaping and the fusing in a state in which the softened state of the end surfaces 50 is maintained in this way, the end surfaces 50 of the multicore fibers 2 can be prevented from being deformed due to repetition of softening and hardening due to heating and cooling.

In this way, the multicore fibers 2 are connected and the cores 11 of the multicore fibers 2 are optically coupled to each other, whereby the multicore fiber connector 1 illustrated in FIG. 1 is obtained.

As described above, according to the method of connecting the multicore fibers 2 of this embodiment, since the multicore fibers 2 satisfy Expression (1) and Expression (2) is satisfied in the shaping step S2, it is possible to reduce the connection loss. Accordingly, the multicore fiber connector 1 can reduce the connection loss. The reason of reduction in the connection loss in this way is considered as follows, though not clear. That is, it is considered that even when a distortion is caused on the side surface of the clad 20 at the connection portion in the fusing step S3, an influence of the distortion on the cores can be suppressed by satisfying Expression (1). It is also considered that the inclination angle of the core surface located on the shaped end surface 50 or the distance in the longitudinal direction of the multicore fiber 2 from the most protruding apex AP of the end surface 50 to the core surface can be set to be smaller than a predetermined value to suppress the distortion of the cores 11 at the time of fusing by satisfying Expression (2).

Since the shaping step S2 of this embodiment is performed in a state in which the multicore fibers 2 butt each other after the butting step S1, the end surfaces of two multicore fibers can be shaped with the substantially same conditions and can be shaped into the substantially same shape. For example, when the shaping is performed by electric discharge as described above, the end surfaces of two multicore fibers can be shaped into the substantially same shape by one time of electric discharge.

While the present invention has been described with reference to the embodiments, the present invention is not limited to these embodiments.

In the above-mentioned embodiment, the cores 11 are arranged in a 1-6 arrangement manner, but the number of cores or the arrangement thereof is not particularly limited.

In the above-mentioned embodiment, the multicore fibers 2 and the pair of discharge electrodes 60 are arranged horizontally, but the multicore fibers 2 and the pair of discharge electrodes 60 may not be arranged horizontally in this embodiment, as long as the multicore fibers can be fused to each other.

In the multicore fiber 2 according to the above-mentioned embodiment, the cores 11 are surrounded with the clad 20 without any gap therebetween. However, the present invention is not limited to this configuration, but the multicore fiber may be a so-called trench-type multicore fiber. In the trench-type multicore fiber, each core 11 is individually surrounded with an inner clad having a refractive index lower than that of the core 11 and the inner clad is individually surrounded with a trench portion having a lower refractive index. An element including the core 11, the inner clad, and the trench portion may be called a core element. Every core element is surrounded with the clad having a refractive index higher than that of the trench portion and lower than that of the core.

In the above-mentioned embodiment, the shaping step S2 is performed in a state in which the end surfaces 50 of the multicore fibers 2 to be connected to each other butt each other, but the shaping step S2 may be performed before performing the butting step 31.

In the above-mentioned embodiment, the shaping and the connecting of the end surfaces 50 are performed by heating due to electric discharge. However, the present invention is not limited to this configuration, but at least one of the shaping step S2 and the fusing step S3 may be performed by another heating. Examples of this heating means include an oxyhydrogen burner and laser irradiation.

EXAMPLES

The present invention will be described below in more detail with reference to examples and comparative examples, but the present invention is not limited to the examples.

Example 1

Plural multicore fibers 2 having the same structure as in the first embodiment were prepared, and the inner side protective layers 31 and the outer side protective layers 32 were peeled off. In each multicore fiber 2, the diameter of the clad 20 was 185 µm, the diameter of each core 11 was 9.8 µm, and the inter-core distance was 49.5 µm. The outer clad thickness Y was 43 µm.

Two multicore fibers 2 were grouped as a set to constitute samples 1-1 to 1-4. The end surfaces of the multicore fibers 2 were shaped by the same shaping step S2 as in the above-mentioned embodiment. In the shaping step S2, the heating was performed such that the distance X in the longitudinal direction of each multicore fiber 2 from the apex AP on the end surface 50 to the portion ED at which the end surface 50 meets the side surface of the clad 20 varies depending on the samples. The ratios (X/Y) of X and Y in samples 1-1 to 1-4 are shown in Table 1. Then, in the same way as in the above-mentioned embodiment, the multicore fibers 2 were connected to obtain a multicore fiber connector 1. The connecting conditions in samples 1-1 to 1-4 were set to the same.

Light was made to be incident on the cores 11 and a connection loss was measured. The connection loss was measured using an optical time-domain reflection measuring (OTDR) method. The average of the measured connection losses of the cores 11 on the outer periphery side for each sample is shown in Table 1.

TABLE 1

| Sample | X/Y  | Connection loss average [dB] |
|--------|------|------------------------------|
| 1-1    | 37.4 | 0.13                         |
| 1-2    | 41.2 | 0.28                         |
| 1-3    | 63.0 | 0.80                         |
| 1-4    | 81.5 | 1.13                         |

Figure 7:
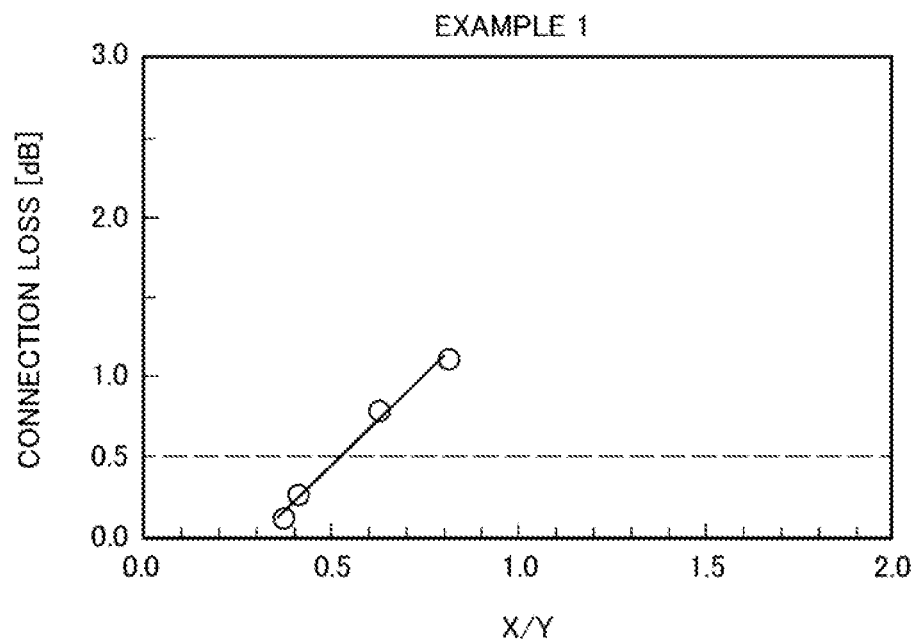
FIG. 7 is a diagram illustrating a relationship between an X/Y and a connection loss in Example 1.

Here, the relationship between the ratio (X/Y) of X and Y and the connection loss average shown in Table 1 is illustrated in FIG. 7. In FIG. 7, a solid line is a straight line which is obtained by approximating points indicating the relationships in samples 1-1 to 1-4 using a least square method. In FIG. 7, a dotted line indicates a connection loss of 0.5 dB.

The intersection of the solid line and the dotted line in FIG. 7, that is, X/Y at which the connection loss is 0.5 dB, was 0.518.

Example 2

Figure 8:
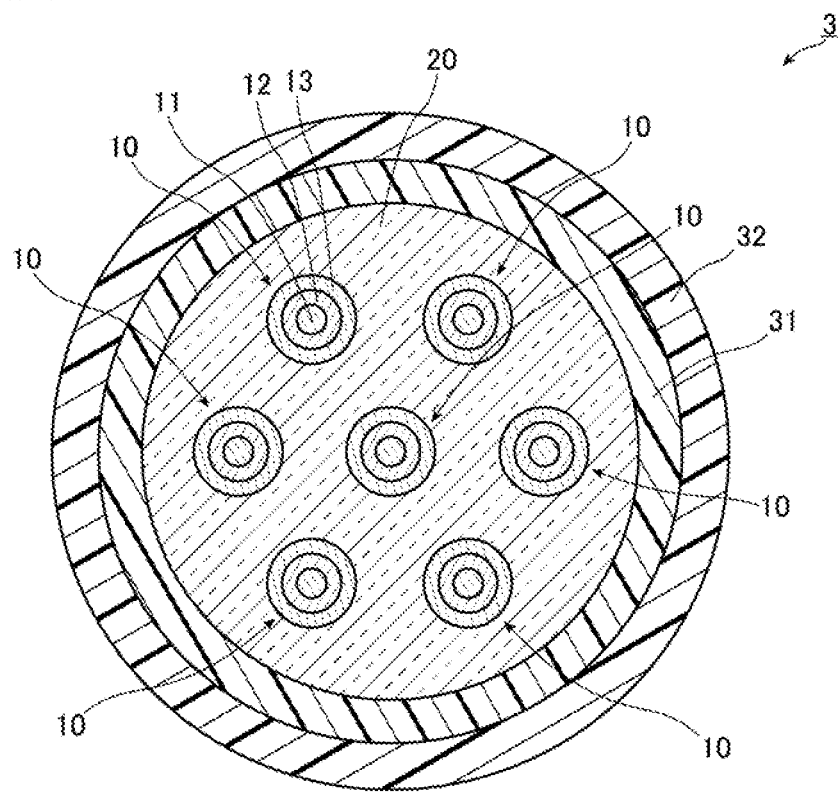
FIG. 8 is a cross-sectional view of a multicore fiber which is used in Example 2.

FIG. 8 is a diagram illustrating a multicore fiber to be connected in this example. In the multicore fiber 3 illustrated in FIG. 8, the elements equal or equivalent to those of the multicore fiber 2 illustrated in FIG. 2 are referenced by equal reference signs unless particularly mentioned and description thereof are not repeated.

As illustrated in FIG. 8, the multicore fiber 3 is a so-called trench-type multicore fiber. The multicore fiber 3 of this example is different from the multicore fiber 2 illustrated in FIG. 2, in that core elements 10 including a core 11 are arranged. In each core element 10, the core 11 is surrounded with an inner clad 12 having a refractive index lower than that of the core 11 and the inner clad 12 is surrounded with a trench portion 13 having a refractive index lower than those of the inner clad 12 and the clad 20. Each core element 10 is surrounded with the clad 20.

Plural multicore fibers 3 were prepared, and the inner side protective layers and the outer side protective layers were peeled off. In each multicore fiber 3, the diameter of the clad 20 was 185 μm, the diameter of each core 11 was 9.8 μm, and the inter-core distance was 49.5 μm. The outer clad thickness Y was 43 μm. That is, the diameter of the clad 20, the diameter of each core 11, the inter-core distance, and the outer clad thickness Y in each multicore fiber 3 were the same as the corresponding values in the multicore fiber 2 in Example 1.

Two multicore fibers 3 were grouped as a set to constitute samples 2-1 to 2-4. The end surfaces of the multicore fibers 3 were shaped by the same shaping step S2 as in the above-mentioned embodiment. In the shaping step S2 of this example, the heating was performed such that the distance X after the shaping varies depending on the samples. The ratios (X/Y) of X and Y in samples 2-1 to 2-4 are shown in Table 2. Then, in the same way as in Example 1, the multicore fibers 3 were connected to obtain a multicore fiber connector. The connecting conditions in samples 2-1 to 2-4 were set to the same as in Example 1.

Light was made to be incident on the cores 11 of the multicore fiber connectors of samples 2-1 to 2-4 and a connection loss was measured in the same way as in Example 1. The average of the measured connection losses of the cores 11 on the outer periphery side for each sample is shown in Table 2.

TABLE 2

| Sample | X/Y | Connection loss average [dB] |
| --- | --- | --- |
| 2-1 | 36.2 | 0.15 |
| 2-2 | 40.3 | 0.26 |
| 2-3 | 67.3 | 0.95 |
| 2-4 | 83.0 | 1.24 |

Here, the relationship between the ratio (X/Y) of X and Y and the connection loss average shown in Table 2 is illustrated in FIG. 8. In FIG. 8, a solid line is a straight line which is obtained by approximating points indicating the relationships in samples 2-1 to 2-4 using a least square method. In FIG. 8, a dotted line indicates a connection loss of 0.5 dB. The intersection of the solid line and the dotted line in FIG. 8, that is, X/Y at which the connection loss is 0.5 dB, was 0.502.

From the results of Examples 1 and 2, even when the cores 11 are directly surrounded with the clad 20 as in Example 1 or even when the multicore fiber is a trench-type multicore fiber 3 in which each core 11 is a part of a core element 10 as in this example, there was no great difference in the X/Y at which the connection loss is 0.5 dB. Accordingly, when Y is 43 μm as in Example 1 or this example, it could be seen that it is possible to reduce the connection loss and to connect the multicore fibers 3, for example, by setting X/Y to 0.50 or less.

Example 3

Plural multicore fibers 3 illustrated in FIG. 8 were prepared. In each multicore fiber 3 of this example, the diameter of the clad 20 was 160 μm, the diameter of each core 11 was 8.9 μm, and the core pitch was 45 μm. The outer clad thickness Y was 35 μm.

Two multicore fibers 3 were grouped as a set to constitute samples 3-1 to 3-4. The end surfaces of the multicore fibers 3 were shaped by the same shaping step S2 as in the above-mentioned embodiment. In the shaping step S2 of this example, the heating was performed such that the distance X after the shaping varies depending on the samples. The ratios (X/Y) of X and Y in samples 3-1 to 3-4 are shown in Table 3. Then, in the same way as in Example 1, the multicore fibers 3 were connected to obtain a multicore fiber connector. The connecting conditions in samples 3-1 to 3-4 were set to the same as in Example 1.

Light was made to be incident on the cores 11 of the multicore fiber connectors of samples 3-1 to 3-4 and a connection loss was measured in the same way as in Example 1. The average of the measured connection losses of the cores 11 on the outer periphery side for each sample is shown in Table 3.

TABLE 3

| Sample | X/Y | Connection loss average [dB] |
| --- | --- | --- |
| 3-1 | 34.0 | 0.22 |
| 3-2 | 41.8 | 0.38 |
| 3-3 | 70.6 | 1.10 |
| 3-4 | 84.2 | 1.35 |

Figure 9:
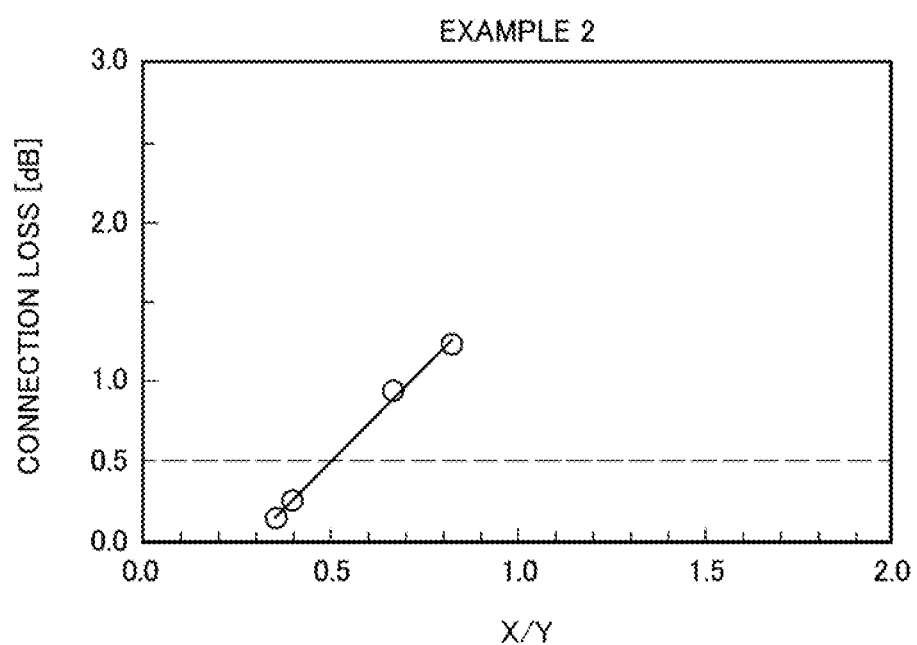
FIG. 9 is a diagram illustrating a relationship between an X/Y and a connection loss in Example 2.

Here, the relationship between the ratio (X/Y) of X and Y and the connection loss average shown in Table 3 is illustrated in FIG. 9. In FIG. 9, a solid line is a straight line which is obtained by approximating points indicating the relationships in samples 3-1 to 3-4 using a least square method. In FIG. 9, a dotted line indicates a connection loss of 0.5 dB. The intersection of the solid line and the dotted line in FIG. 9, that is, X/Y at which the connection loss is 0.5 dB, was 0.462.

Accordingly, when Y is 35 μm as in this example, it could be seen that it is possible to reduce the connection loss and to connect the multicore fibers 3, for example, by setting X/Y to 0.45 or less.

Example 4

Plural multicore fibers 3 illustrated in FIG. 8 were prepared. In each multicore fiber 3 of this example, the diameter of the clad 20 was 210 μm, the diameter of each core 11 was 10.9 μm, and the core pitch was 55 μm. The outer clad thickness Y was 50 μm.

Two multicore fibers 3 were grouped as a set to constitute samples 4-1 to 4-4. The end surfaces of the multicore fibers 3 were shaped by the same shaping step S2 as in the above-mentioned embodiment. In the shaping step S2 of this example, the heating was performed such that the distance X after the shaping varies depending on the samples. The ratios (X/Y) of X and Y in samples 4-1 to 4-4 are shown in Table 4. Then, in the same way as in Example 1, the multicore fibers 3 were connected to obtain a multicore fiber connector. The connecting conditions in samples 4-1 to 4-4 were set to the same as in Example 1.

Light was made to be incident on the cores 11 of the multicore fiber connectors of samples 4-1 to 4-4 and a connection loss was measured in the same way as in Example 1. The average of the measured connection losses of the cores 11 on the outer periphery side for each sample is shown in Table 4.

TABLE 4

| Sample | X/Y | Connection loss average [dB] |
|---|---|---|
| 4-1 | 35.1 | 0.22 |
| 4-2 | 51.3 | 0.40 |
| 4-3 | 73.0 | 1.05 |
| 4-4 | 93.2 | 1.35 |

Figure 10:
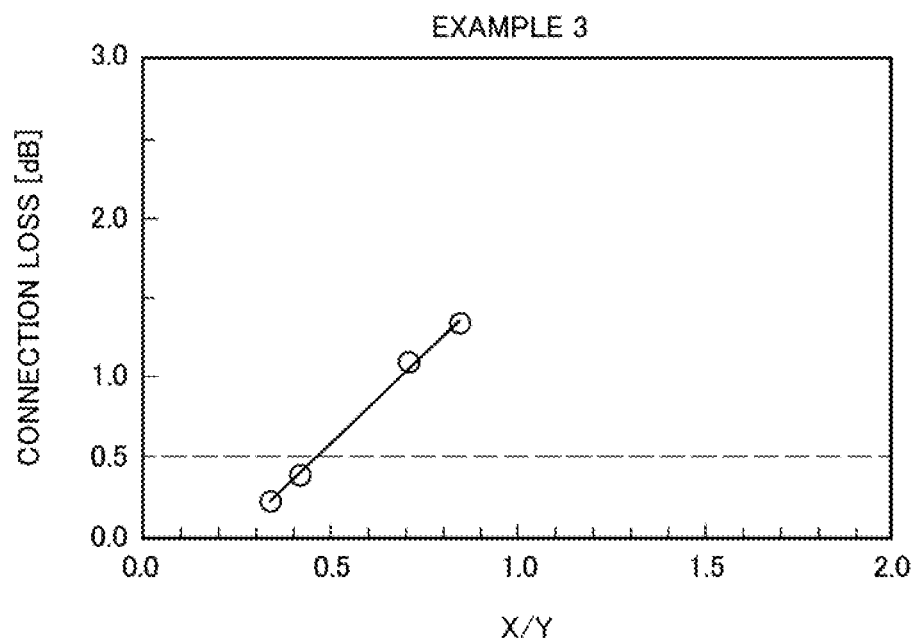
FIG. 10 is a diagram illustrating a relationship between an X/Y and a connection loss in Example 3.

Here, the relationship between the ratio (X/Y) of X and Y and the connection loss average shown in Table 4 is illustrated in FIG. 10. In FIG. 10, a solid line is a straight line which is obtained by approximating points indicating the relationships in samples 4-1 to 4-4 using a least square method. In FIG. 10, a dotted line indicates a connection loss of 0.5 dB. The intersection of the solid line and the dotted line in FIG. 10, that is, X/Y at which the connection loss is 0.5 dB, was 0.560.

Accordingly, when Y is 50 μm as in this example, it could be seen that it is possible to reduce the connection loss and to connect the multicore fibers 3, for example, by setting X/Y to 0.56 or less.

Example 5

Plural multicore fibers 3 illustrated in FIG. 8 were prepared. In each multicore fiber 3 of this example, the diameter of the clad 20 was 140 μm, the diameter of each core 11 was 7.8 μm, and the core pitch was 45 μm. The outer clad thickness Y was 25 μm.

Two multicore fibers 3 were grouped as a set to constitute samples 5-1 to 5-4. The end surfaces of the multicore fibers 3 were shaped by the same shaping step S2 as in the above-mentioned embodiment. In the shaping step S2 of this example, the heating was performed such that the distance X after the shaping varies depending on the samples. The ratios (X/Y) of X and Y in samples 5-1 to 5-4 are shown in Table 5. Then, in the same way as in Example 1, the multicore fibers 3 were connected to obtain a multicore fiber connector. The connecting conditions in samples 5-1 to 5-4 were set to the same as in Example 1.

Light was made to be incident on the cores 11 of the multicore fiber connectors of samples 5-1 to 5-4 and a connection loss was measured in the same way as in Example 1. The average of the measured connection losses of the cores 11 on the outer periphery side for each sample is shown in Table 5.

TABLE 5

| Sample | X/Y | Connection loss average [dB] |
|---|---|---|
| 5-1 | 33.1 | 0.25 |
| 5-2 | 38.4 | 0.40 |
| 5-3 | 68.6 | 1.18 |
| 5-4 | 82.2 | 1.60 |

Figure 11:
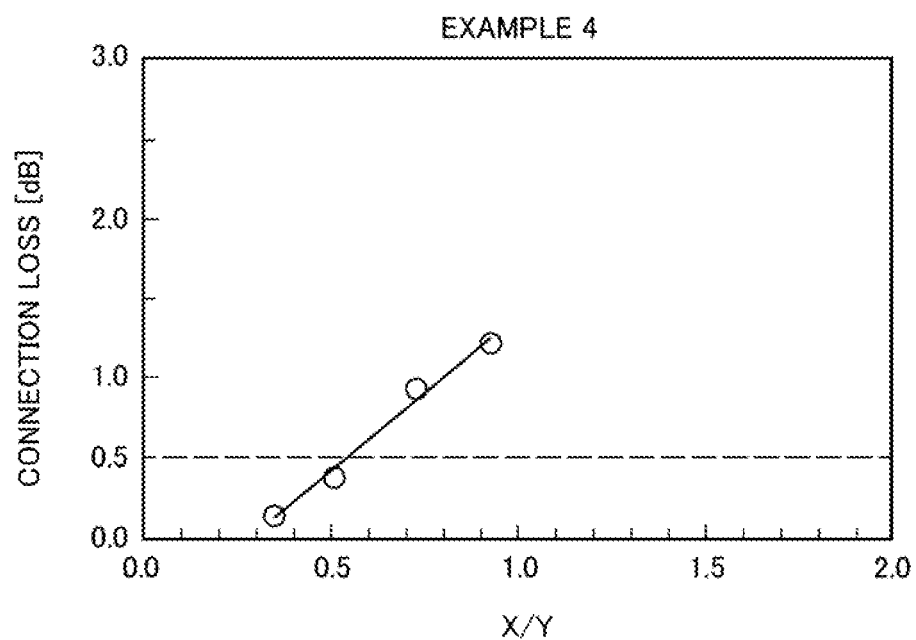
FIG. 11 is a diagram illustrating a relationship between an X/Y and a connection loss in Example 4.

Here, the relationship between the ratio (X/Y) of X and Y and the connection loss average shown in Table 5 is illustrated in FIG. 11. In FIG. 11, a solid line is a straight line which is obtained by approximating points indicating the relationships in samples 5-1 to 5-4 using a least square method. In FIG. 11, a dotted line indicates a connection loss of 0.5 dB. The intersection of the solid line and the dotted line in FIG. 11, that is, X/Y at which the connection loss is 0.5 dB, was 0.423.

Accordingly, when Y is 25 μm as in this example, it could be seen that it is possible to reduce the connection loss and to connect the multicore fibers 3, for example, by setting X/Y to 0.42 or less.

Example 6

Figure 12:
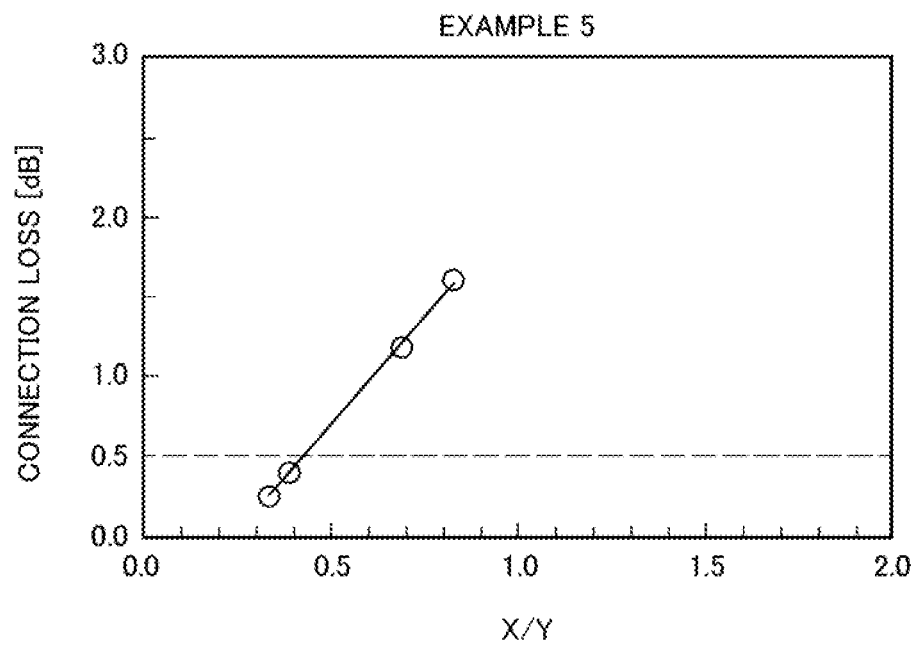
FIG. 12 is a diagram illustrating a relationship between an X/Y and a connection loss in Example 5.

FIG. 12 is a diagram illustrating a multicore fiber to be connected in this example. In a multicore fiber 4 illustrated in FIG. 12, the elements equal or equivalent to those of the multicore fiber 3 illustrated in FIG. 8 are referenced by equal reference signs unless particularly mentioned and description thereof are not repeated.

The multicore fiber 4 according to this example is different from the multicore fiber 3 illustrated in FIG. 8, in the following. That is, as illustrated in FIG. 12, in the multicore fiber 4, a core element 10 is not arranged at the center of the clad 20 and six core elements 10 are arranged on the outer periphery side of the core elements 10 on the outer periphery side in FIG. 8.

Plural multicore fibers 4 were prepared, and the inner side protective layers and the outer side protective layers were peeled off. In each multicore fiber 4, the diameter of the clad 20 was 230 μm, the diameter of each core 11 was 9.9 μm, and the core pitch was 44.5 μm. The outer clad thickness Y was 38 μm.

Two multicore fibers 4 were grouped as a set to constitute samples 6-1 to 6-4. The end surfaces of the multicore fibers 4 were shaped by the same shaping step S2 as in the above-mentioned embodiment. In the shaping step S2 of this example, the heating was performed such that the distance X after the shaping varies depending on the samples. The ratios (X/Y) of X and Y in samples 6-1 to 6-4 are shown in Table 6. Then, in the same way as in Example 1, the multicore fibers 4 were connected to obtain a multicore fiber connector. The connecting conditions in samples 6-1 to 6-4 were set to the same as in Example 1.

Light was made to be incident on the cores 11 of the multicore fiber connectors of samples 6-1 to 6-4 and a connection loss was measured in the same way as in Example 1. The cores of which the connection loss was measured were set to the cores located on the outer periphery side. The average of the measured connection losses of the outer periphery side cores 11 for each sample is shown in Table 6.

TABLE 6

| Sample | X/Y | Connection loss average [dB] |
|---|---|---|
| 6-1 | 34.8 | 0.16 |
| 6-2 | 42.0 | 0.32 |
| 6-3 | 69.2 | 1.06 |
| 6-4 | 153.8 | 3.85 |

Figure 13:
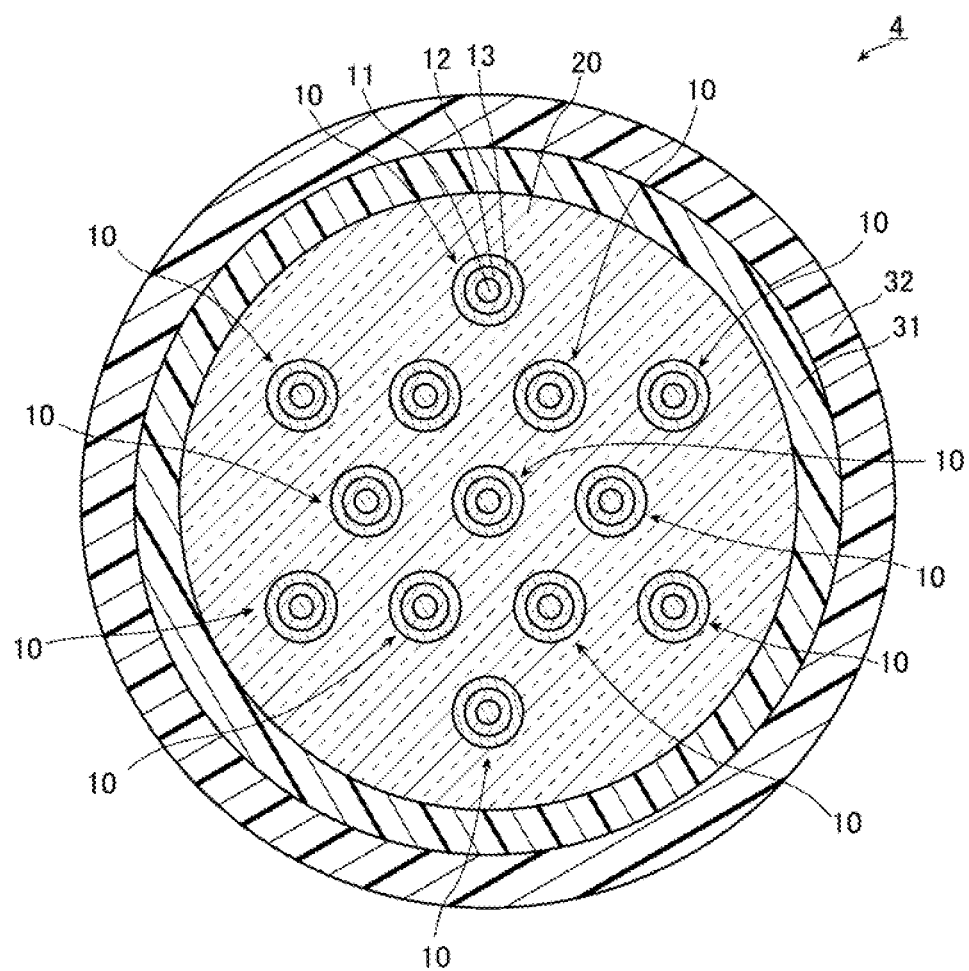
FIG. 13 is a cross-sectional view of a multicore fiber which is used in Example 6.

Here, the relationship between the ratio (X/Y) of X and Y and the connection loss average shown in Table 6 is illustrated in FIG. 13. In FIG. 13, a solid line is a straight line which is obtained by approximating points indicating the relationships in samples 6-1 to 6-4 using a least square method. In FIG. 13, a dotted line indicates a connection loss of 0.5 dB. The intersection of the solid line and the dotted line in FIG. 13, that is, X/Y at which the connection loss is 0.5 dB, was 0.478.

Accordingly, when Y is 38 μm as in this example, it could be seen that it is possible to reduce the connection loss and to connect the multicore fibers 3, for example, by setting X/Y to 0.48 or less.

Figure 14:
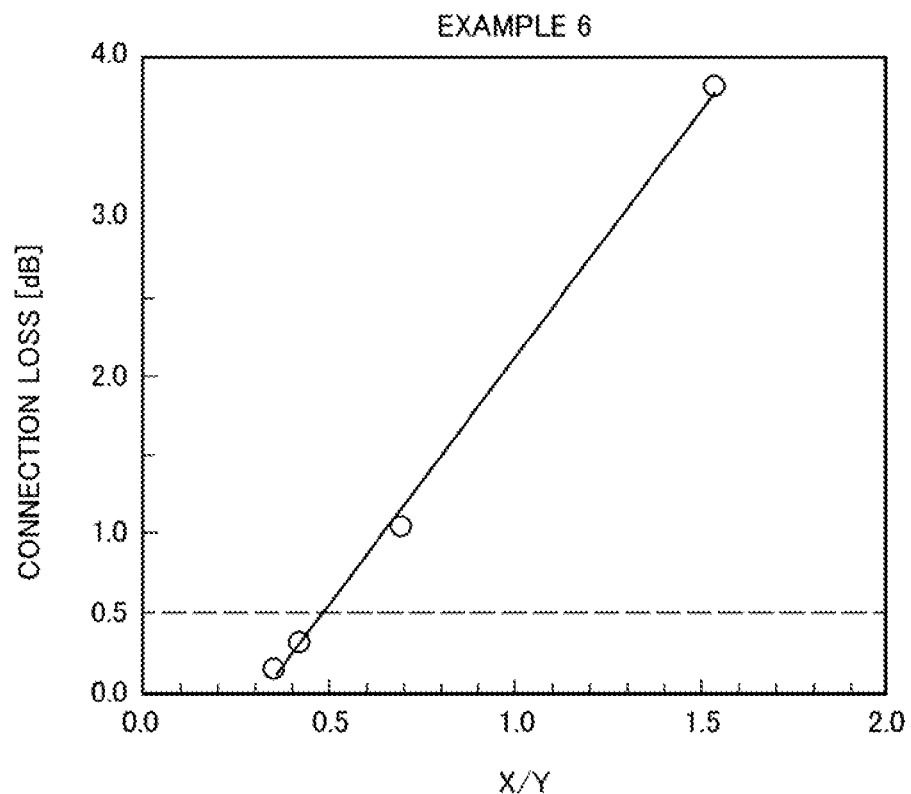
FIG. 14 is a diagram illustrating a relationship between an X/Y and a connection loss in Example 6.
Figure 15:
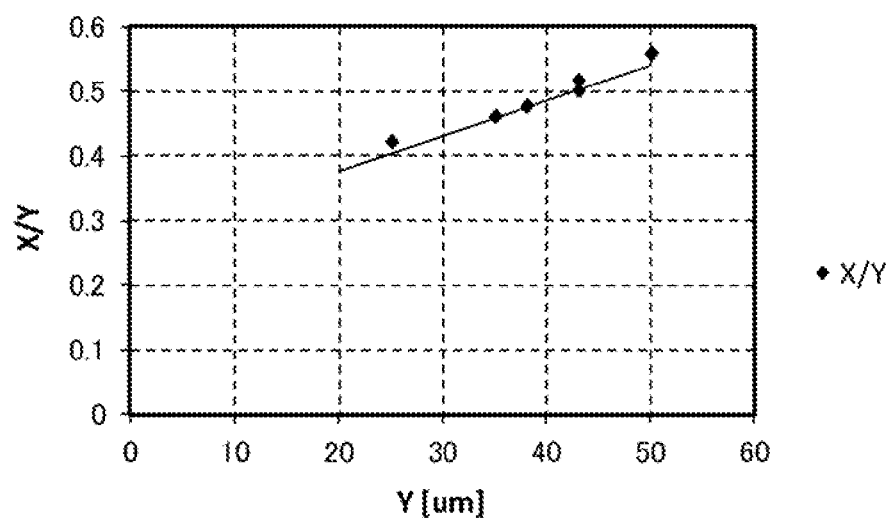
FIG. 15 is a diagram illustrating a Y and an X/Y at which the connection loss is 0.5 dB in Examples 1 to 6.

The relationship between Y and X/Y at which the connection loss is 0.5 dB in Examples 1 to 6 is shown in FIG. 14. It could be seen that points indicating the relationship between Y and X/Y at which the connection loss is 0.5 dB in Examples 1 to 6 were arranged in a substantially straight line. Therefore, the slope of the straight line was calculated using a least square method, and an expression of the straight line when at least one point is located in the straight line with the slope and the other points are located above the straight line was calculated. The straight line is expressed by the following Expression (3).

$$X/Y = 0.0054Y + 0.268 \quad (3)$$

Accordingly, it could be seen that the connection loss was equal to or less than 0.5 dB by performing the shaping such that X/Y was located in an area below the straight line indicated by Expression (3).

It can be seen from the above-mentioned examples that the connection loss can be reduced by performing the heating so as to satisfy the above Expression (2) in the shaping step S2. When Y is less than 20 μm, it is considered that a distortion of the outer peripheral surface of the clad in the connected portion affects the cores to increase the connection loss.

As described above, according to the present invention, it is possible to provide a multicore fiber connection method which can reduce connection loss and a multicore fiber connector using the method, which can be applicable to the fields of optical communication and the like.

REFERENCE SIGNS LIST

1 . . . multicore fiber connector
2, 3, 4 . . . multicore fiber
10 . . . core element
11 . . . core
12 . . . inner clad
13 . . . trench portion
20 . . . clad
50 . . . end surface
60 . . . discharge electrode
S1 . . . butting step
S2 . . . shaping step
S3 . . . fusing step

The invention claimed is:

1. A multicore fiber connection method of connecting multicore fibers, comprising:
    a preparing step of preparing a first multicore fiber and a second multicore fiber, each including a plurality of cores and a clad surrounding the plurality of cores, wherein each of the first and second multicore fibers satisfies Y≥20 where a distance from a center of a outermost core located at the radially outermost position in a cross section of the clad to a side surface of the clad is defined as Y μm,
    a shaping step of shaping a longitudinal end surface of each of the first and second multicore fibers to remove unevenness therefrom, the shaping step including heating each of the end surfaces of the first and second multicore fibers to have a convex surface shape which satisfies 0<X/Y≤0.0054Y+0.268 where X denotes a distance along a longitudinal direction of each of the multicore fibers from the most protruding point in the convex surface shape in the longitudinal direction to a position at which the end surface and the side surface of the clad meet each other; and
    a fusing step of abutting and fusing the shaped end surfaces of the first and second multicore fibers to each other.

2. The multicore fiber connection method according to claim 1, further comprising, before the shaping step, an abutting step of causing the end surfaces of the first and second multicore fibers to face each other such that each of the cores of the first multicore fiber faces a corresponding one of the cores of the second multicore fiber with a predetermined gap interposed therebetween,
    wherein the shaping step is performed in a state in which the end surfaces of the first and second multicore fibers face each other such that each of the cores of the first multicore fiber faces the corresponding one of the cores of the second multicore fiber with the predetermined gap interposed therebetween.

3. The multicore fiber connection method according to claim 2, wherein the end surfaces of the multicore fibers are continuously heated from the shaping step to the fusing step.

4. The multicore fiber connection method according to claim 1, wherein the multicore fibers satisfy Y≥25, and
    the shaping step includes heating the end surfaces so as to satisfy X/Y≤0.42.

5. The multicore fiber connection method according to claim 1, wherein the multicore fibers satisfy Y≥35, and
    the shaping step includes heating the end surfaces so as to satisfy X/Y≤0.45.

6. The multicore fiber connection method according to claim 1, wherein the multicore fibers satisfy Y≥43, and
    the shaping step includes heating the end surfaces so as to satisfy X/Y≤0.50.

* * * * *